United States Patent
Wolf et al.

(10) Patent No.: US 10,736,342 B2
(45) Date of Patent: Aug. 11, 2020

(54) ASEPTIC PROTEIN BEVERAGE AND METHOD OF PREPARATION

(71) Applicant: General Mills, Inc., Minneapolis, MN (US)

(72) Inventors: Michele Wolf, St. Louis Park, MN (US); Erika Smith, Maple Grove, MN (US); Jon Firebaugh, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 634 days.

(21) Appl. No.: 15/060,146

(22) Filed: Mar. 3, 2016

(65) Prior Publication Data

US 2017/0251703 A1   Sep. 7, 2017

(51) Int. Cl.

| A23L 2/66 | (2006.01) |
|---|---|
| A23L 2/08 | (2006.01) |
| A23L 2/46 | (2006.01) |
| A23L 2/52 | (2006.01) |
| A23L 2/56 | (2006.01) |
| A23L 2/68 | (2006.01) |

(52) U.S. Cl.
CPC ............ *A23L 2/66* (2013.01); *A23L 2/08* (2013.01); *A23L 2/46* (2013.01); *A23L 2/52* (2013.01); *A23L 2/56* (2013.01); *A23L 2/68* (2013.01); *A23V 2002/00* (2013.01)

(58) Field of Classification Search
CPC ..... A23L 2/08; A23L 2/46; A23L 2/52; A23L 2/66; A23L 2/68; A23L 2/56; A23V 2002/00

See application file for complete search history.

(56) References Cited

U.S. PATENT DOCUMENTS

| 1,955,864 A | 4/1934 | Stevens |
| 6,126,981 A | 10/2000 | Lee et al. |
| 6,824,802 B2 | 11/2004 | Bautista et al. |
| 7,824,724 B2 | 11/2010 | Yokoo et al. |
| 8,940,353 B2 | 1/2015 | Bringe et al. |
| 2003/0194468 A1* | 10/2003 | Konkoly ............ A23C 9/13 426/34 |
| 2005/0025861 A1 | 2/2005 | Luhadiya et al. |
| 2011/0293800 A1 | 12/2011 | Sher et al. |

FOREIGN PATENT DOCUMENTS

| EP | 2476317 | 7/2012 |
| JP | 2011120479 | 6/2011 |
| WO | WO 1992/020240 | 11/1992 |
| WO | WO 1993/017590 | 9/1993 |
| WO | WO 2002/026054 | 4/2002 |
| WO | 2002/089591 | 11/2002 |
| WO | 2014/210326 | 12/2014 |
| WO | WO 2015/152322 | 10/2015 |

OTHER PUBLICATIONS

CN104738191A Machine translation Jul. 2015 (Year: 2015).*
CN104738191A—Abstract Jul. 2015 (Year: 2015).*
WO2015005124A1 Jan. 2015, Abstract and equivalent publication in English (Year: 2015).*
RU2335992C2—Abstract and Machine translation (Year: 2008).*
Mintel, "Almond Milk Tea", retrieved from Internet: http://www.gnpd.com, Nov. 27, 2014.

* cited by examiner

*Primary Examiner* — Subbalakshmi Prakash
(74) *Attorney, Agent, or Firm* — Diederiks & Whitelaw, PLC; Annette M. Frawley, Esq.

(57) ABSTRACT

Aseptic beverage products are prepared by mixing beverage ingredients together. The beverage ingredients include a protein source, such as a milk protein concentrate, and at least one buffering agent, with the at least one buffering agent including baking soda. Preferably, the at least one buffering agent further includes lemon juice concentrate. The pH of the beverage ingredients is adjusted to a level between 6.7 and 7.0 using the at least one buffering agent. The beverage ingredients are then heated to at least 139° C., and the at least one buffering agent prevents precipitation of the protein source during heating. Afterwards, the beverage ingredients are packaged as a plurality of aseptic beverage products.

9 Claims, No Drawings

ASEPTIC PROTEIN BEVERAGE AND METHOD OF PREPARATION

BACKGROUND OF THE INVENTION

The present invention pertains to beverage products and, more particularly, to the use of buffer systems in protein beverage products.

When producing, packaging and selling beverage products at large scale, certain issues can arise that might not be present when the beverage products are created on a smaller scale. For example, precipitation or gel formation can occur, which can cause difficulties during processing or result in an end product having a consistency or texture that is considered undesirable by a consumer. These issues are particularly prevalent in connection with making protein drinks, specifically protein drinks that rely on milk as a protein source. In addition, one increasingly popular goal when creating a food product is that the food product conform to "clean label" standards, i.e., that the listed ingredients of the food product are recognizable to a consumer. To date, overcoming the above issues has run afoul of the desire for a clean label. As a result, there is a need in the art for a way to prevent issues such as precipitation or gel formation from occurring in beverage products without the use of ingredients that fail to meet clean label standards.

SUMMARY OF THE INVENTION

The present invention is directed to aseptic beverage products and methods of preparing aseptic beverage products. To prepare the aseptic beverage products, beverage ingredients are mixed together. The beverage ingredients include a protein source, preferably a protein concentrate, and at least one buffering agent, with the at least one buffering agent including baking soda. Preferably, the at least one buffering agent further includes lemon juice concentrate. The pH of the beverage ingredients is adjusted using the at least one buffering agent. The beverage ingredients are then heated, and the at least one buffering agent prevents precipitation of the protein concentrate during heating. Afterwards, the beverage ingredients are packaged as a plurality of aseptic beverage products.

In a preferred embodiment, the pH of the beverage ingredients is adjusted to a range of 6.7 to 7.0 and, more preferably, between 6.8 and 6.9. Also, the protein concentrate is milk protein concentrate, and the beverage ingredients further include almond cream and vanilla flavor, chocolate flavor or cocoa powder. Preferably, heating the beverage ingredients includes heating the beverage ingredients by direct steam injection.

Additional objects, features and advantages of the invention will become more readily apparent from the following detailed description of preferred embodiments thereof.

DETAILED DESCRIPTION OF PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, when a value of a property is specified, the value is intended to encompass a range of values +/−5%. When the modifier "about" is used, the range is increased to +/−10%. For example, specifying a temperature of "100° C." includes the range from 95° C. to 105° C., and "about 100° C." includes the range from 90° C. to 110° C.

In connection with the present invention, an aseptic beverage was developed that contains almond milk as a base and a milk protein source, preferably a milk protein concentrate. During the scale up process, some functional issues were identified when direct heating was used. In particular, protein precipitation and gel formation were found to be occurring as a result of direct steam injection. Without being bound to any particular theory, the current understanding is that these issues were due to the interaction of gums with calcium from the milk protein concentrate. Surprisingly, the heat stability of the beverage increased when a buffering agent was added, with the result being a stable beverage with no observed precipitation. These results are shown below in Table 1 for two different almond milk/milk protein concentrate beverage flavors: vanilla and chocolate. The buffering agent used was potassium citrate.

TABLE 1

| Description | pH Before Heating | pH After Heating | Observation |
| --- | --- | --- | --- |
| Vanilla Beverage Sample (No Buffer) | 6.8 | 6.65 | Small particles observed. Sample slightly more viscous than buffered sample. |
| Vanilla Beverage Sample (Potassium Citrate Buffer) | 6.91 | 6.89 | Heat stable: no precipitation or flocculation observed. |
| Chocolate Beverage Sample (No Buffer) | 6.65 | 6.5 | Small particles observed. Sample slightly more viscous than buffered sample. |
| Chocolate Beverage Sample (Potassium Citrate Buffer) | 6.67 | 6.68 | Heat stable: no precipitation or flocculation observed. |

In connection with the addition of a buffering agent, it is beneficial to use the buffering agent to adjust the pH of the beverage to a specific point prior to heat treatment of the beverage. In the case of the present almond beverage, the maximum heat stability is in the pH range of 6.8 to 6.9. More generally, the almond beverage is heat stable in the pH range of 6.7 to 7.0 depending on the specific beverage formulation. However, the heat stability is considered poor in the pH range of 6.3 to 6.6. In order to verify this determination, the heat stability of the beverage was tested and, more specifically, the heat stability of the milk concentrate. The heat stability of milk (or milk concentrate) refers to the ability of milk to withstand very high temperatures (e.g., ultra-high temperature processing or retort sterilization) without visible flocculation, precipitation, coagulation or gelation. The results of the heat stability testing are shown below in Tables 2 and 3 for the vanilla and chocolate almond beverage formulations. Baking powder or lemon juice concentrate was added prior to heating to adjust the pH to the desired range.

TABLE 2

| Description | Buffer | pH Before Heating | pH After Heating | Observation |
|---|---|---|---|---|
| Vanilla Beverage Sample | Baking Powder | 6.99 | 6.89 | Minor clots. |
| Vanilla Beverage Sample | Baking Powder | 6.86 | 6.78 | No clots/precipitates. |
| Vanilla Beverage Sample (Control) | No Buffer | 6.79 | 6.74 | No clots/precipitates. |
| Vanilla Beverage Sample | Lemon Juice Concentrate | 6.75 | 6.69 | Very minor clots. |
| Vanilla Beverage Sample | Lemon Juice Concentrate | 6.67 | 6.59 | Clear clots and precipitates. |
| Vanilla Beverage Sample | Lemon Juice Concentrate | 6.58 | 6.52 | Clear clots and precipitates. |
| Vanilla Beverage Sample | Lemon Juice Concentrate | 6.47 | 6.4 | Clear clots and precipitates. |
| Vanilla Beverage Sample | Lemon Juice Concentrate | 6.38 | 6.37 | Clear clots and precipitates. |

TABLE 3

| Description | Buffer | pH Before Heating | pH After Heating | Observation |
|---|---|---|---|---|
| Chocolate Beverage Sample | Baking Powder | 7.05 | 6.98 | Minor clots. |
| Chocolate Beverage Sample | Baking Powder | 6.96 | 6.91 | No clots/precipitates. |
| Chocolate Beverage Sample | Baking Powder | 6.82 | 6.73 | No clots/precipitates. |
| Chocolate Beverage Sample | Baking Powder | 6.76 | 6.63 | Minor clots. |
| Chocolate Beverage Sample | Baking Powder | 6.67 | 6.54 | Minor clots. |
| Chocolate Beverage Sample (Control) | No Buffer | 6.58 | 6.42 | Clear sedimentation, clots and precipitates. |
| Chocolate Beverage Sample | Lemon Juice Concentrate | 6.47 | 6.42 | Clear clots and precipitates. |
| Chocolate Beverage Sample | Lemon Juice Concentrate | 6.36 | 6.33 | Clear clots and precipitates. |

As noted above, the buffering agent originally used was potassium citrate. However, a beverage containing potassium citrate does not meet clean label standards. In an effort to produce a stable beverage that meets clean label standards, both cream of tartar (potassium bitartrate) and baking powder (typically, baking soda (sodium bicarbonate) and one or more other acid salts) were added to the beverage in an attempt to prevent the milk protein from precipitating. Unfortunately, it was found that each of these ingredients failed to prevent protein precipitation. With respect to cream of tartar, it was determined that the addition of cream of tartar to the beverage lead to the formation of small clots even before heat treatment. Since cream of tartar is also a buffering agent, one result of these efforts was a finding that not all buffering agents are effective at preventing protein precipitation. It should also be noted that baking powder's ingredients (i.e., baking soda and other acid salts) function as buffering agents. Although Tables 2 and 3 do indicate that certain formulations did not show clots or precipitates, these formulations were not stable. Instead, the formulations simply fell within a certain pH range. Accordingly, fluctuations in pH could lead to clots or precipitation. Fortunately, certain buffering agents do result in stable beverages. Specifically, both baking soda alone and baking soda in combination with lemon juice concentrate meet clean label standards and are effective at preventing protein precipitation during direct heating of the beverage. These results are shown below in Tables 4 and 5. With respect to the baking soda and lemon juice concentrate, the effectiveness of this combination is due, at least in part, to the creation of sodium citrate in situ. Sodium citrate is a buffering agent, which is created, in the present case, by the reaction of sodium bicarbonate (i.e., baking soda) with citric acid from the lemon juice concentrate.

TABLE 4

| Description | Buffer | pH Before Heating | pH After Heating | Observation |
|---|---|---|---|---|
| Vanilla Beverage Sample | Baking Soda and Lemon Juice Concentrate | 6.98 | 6.94 | Stable: no clots/precipitates. |
| Vanilla Beverage Sample | Baking Soda and Lemon Juice Concentrate | 6.94 | 6.89 | Stable: no clots/precipitates. |
| Vanilla Beverage Sample | Baking Soda | 6.93 | 6.88 | Stable: no clots/precipitates. |
| Vanilla Beverage Sample | Baking Soda | 6.84 | 6.78 | Stable: no clots/precipitates. |
| Vanilla Beverage Sample | Baking Soda and Lemon Juice Concentrate | 6.82 | 6.73 | Stable: no clots/precipitates. |
| Vanilla Beverage Sample (Control) | No Buffer | 6.77 | 6.72 | No clots/precipitates. |
| Vanilla Beverage Sample | Cream of Tartar | 6.66 | Not Tested | Small clots before heating. |
| Vanilla Beverage Sample | Cream of Tartar | 6.54 | Not Tested | Small clots before heating. |
| Vanilla Beverage Sample | Cream of Tartar | 6.46 | Not Tested | Small clots before heating. |
| Vanilla Beverage Sample | Cream of Tartar | 6.33 | Not Tested | Small clots before heating. |

TABLE 5

| Description | Buffer | pH Before Heating | pH After Heating | Observation |
|---|---|---|---|---|
| Chocolate Beverage Sample | Baking Soda | 6.99 | 6.88 | Stable: no clots/precipitates. |
| Chocolate Beverage Sample | Baking Soda and Lemon Juice Concentrate | 6.98 | 6.81 | Stable: no clots/precipitates. |

TABLE 5-continued

| Description | Buffer | pH Before Heating | pH After Heating | Observation |
|---|---|---|---|---|
| Chocolate Beverage Sample | Baking Soda | 6.89 | 6.84 | Stable: no clots/precipitates. |
| Chocolate Beverage Sample | Baking Soda and Lemon Juice Concentrate | 6.85 | 6.79 | Stable: no clots/precipitates. |
| Chocolate Beverage Sample | Baking Soda and Lemon Juice Concentrate | 6.81 | 6.7 | Stable: no clots/precipitates. |
| Chocolate Beverage Sample | Baking Soda | 6.78 | 6.74 | Minor clots/precipitates. |
| Chocolate Beverage Sample | No Buffer | 6.67 | 6.56 | Minor clots/precipitates. |
| Chocolate Beverage Sample | Cream of Tartar | 6.54 | Not Tested | Small clots before heating. |
| Chocolate Beverage Sample | Cream of Tartar | 6.42 | Not Tested | Small clots before heating. |
| Chocolate Beverage Sample | Cream of Tartar | 6.26 | Not Tested | Small clots before heating. |

In addition to the above, it was also determined that a longer hydration or homogenization step is beneficial as it ensures proper dissolution of the ingredients. Since some of the ingredients, such as almond cream, have very low heat stabilities, proper dissolution of the ingredients improves the overall heat stability of the beverage. When at the manufacturing location, proper hydration and dissolution steps are taken to ensure the product is safe, e.g., high shear mixing, predetermined hydration times based on ingredients employed, thermal processing controls and uniform ingredient protocols. In this manner, destructive factors, such as variations in the pH of the ingredients, city water or the like which can cause the pH of the beverage to fluctuate to a "danger zone" where precipitation will occur, are avoided.

In connection with the process for preparing beverage products in accordance with the present invention, initially beverage ingredients are mixed together. These beverage ingredients include protein concentrate and at least one buffering agent. However, it should be recognized that a variety of possible beverage ingredients are known in the art and usable in connection with the present invention. Exemplary beverage formulations are provided below in Tables 6 and 7. Specifically, Table 6 provides a formulation for a vanilla almond beverage, and Table 7 provides a formulation for a chocolate almond beverage. The amount of the at least one buffering agent to be used is selected in order to provide a desired pH upon mixing (and prior to any heat treatment). In connection with the almond beverages of the present invention, the desired pH range is preferably between 6.7 and 7.0. Additionally, in preferred almond beverage formulations, the protein concentrate is milk protein concentrate, and the at least one buffering agent is baking soda or baking soda and lemon juice concentrate. After mixing, the beverage ingredients are heat treated. This heat treatment involves heating the beverage ingredients to at least 139° C., with the at least one buffering agent serving to prevent protein precipitation and gel formation during heating. Preferably, the heat treatment includes heating the beverage ingredients by direct steam injection. After the heat treatment, the resulting beverage can be packaged as a plurality of individual beverage products. This packaging can take a variety of forms including cartons or bottles, for example.

TABLE 6

| Ingredient | Baking Soda Only % | Baking Soda and Lemon Juice % |
|---|---|---|
| Water | 85.41175 | 85.41175 |
| Sugar | 6.3 | 6.3 |
| Milk protein concentrate | 4.885 | 4.885 |
| Almond cream | 2.2 | 2.2 |
| Canola oil | 0.6 | 0.6 |
| Vanilla flavor | 0.25 | 0.25 |
| Carrageenan | 0.119 | 0.119 |
| Lecithin | 0.079 | 0.079 |
| Gellan gum | 0.055 | 0.055 |
| Baking Soda | 0.02 | 0.08 |
| Antifoam | 0.00025 | 0.00025 |
| Lemon juice concentrate | 0 | 0.1 |

TABLE 7

| Ingredient | Baking Soda Only % | Baking Soda and Lemon Juice % |
|---|---|---|
| Water | 84.77175 | 84.77175 |
| Sugar | 6.3 | 6.3 |
| Milk protein concentrate | 4.485 | 4.485 |
| Almond cream | 2.2 | 2.2 |
| Cocoa powder | 1.2 | 1.2 |
| Canola oil | 0.4 | 0.4 |
| Chocolate flavor | 0.24 | 0.24 |
| Carrageenan | 0.119 | 0.119 |
| Lecithin | 0.079 | 0.079 |
| Gellan gum | 0.055 | 0.055 |
| Baking soda | 0.036 | 0.08 |
| Antifoam | 0.00025 | 0.00025 |
| Lemon juice concentrate | 0 | 0.066 |

Although exemplary beverage formulations are provided above, it should be recognized that the present invention can be used in connection with other beverages where protein precipitation or gel formation is an issue. Similarly, the amount of buffering agent added will vary based on, for example, the amount of protein and the pH of the beverage before the addition of the buffering agent. In any case, it should be readily apparent that the present invention prevents precipitation and gel formation from occurring in beverage products while still allowing these beverage products to meet clean label standards. Although described with reference to preferred embodiments, it should be readily understood that various changes or modifications could be made to the invention without departing from the spirit thereof. In general, the invention is only intended to be limited by the scope of the following claims.

The invention claimed is:

1. A method of preparing aseptic beverage products comprising:
   mixing beverage ingredients, with the beverage ingredients including a protein source and at least two buffering agents, the at least two buffering agents including baking soda and a citric acid-containing buffering agent, wherein mixing the beverage ingredients includes adjusting the pH of the beverage ingredients to a level between 6.7 and 7.0 using the at least two buffering agents;
   heating the beverage ingredients to at least 139° C., with the at least two buffering agents preventing precipitation of the protein source during heating; and packaging the beverage ingredients as a plurality of aseptic beverage products.

2. The method of claim 1, wherein the citric acid-containing buffering agent is lemon juice concentrate.

3. The method of claim 2, wherein adjusting the pH of the beverage ingredients includes adjusting the pH of the beverage ingredients to a level between 6.8 and 6.9 using the at least two buffering agents.

4. The method of claim 1, wherein the protein source is a milk protein source.

5. The method of claim 4, wherein the milk protein source is a milk protein concentrate.

6. The method of claim 5, wherein the beverage ingredients further include almond cream.

7. The method of claim 6, wherein the beverage ingredients further include vanilla flavor, chocolate flavor or cocoa powder.

8. The method of claim 5, wherein heating the beverage ingredients includes heating the beverage ingredients by direct steam injection.

9. The method of claim 4, wherein the citric acid-containing buffering agent is lemon juice concentrate.

* * * * *